(12) United States Patent
Sun et al.

(10) Patent No.: US 8,642,202 B2
(45) Date of Patent: *Feb. 4, 2014

(54) ORGANIC ELECTROLYTE SOLUTION AND REDOX FLOW BATTERY INCLUDING THE SAME

(75) Inventors: Hee-young Sun, Yongin-si (KR); Joung-won Park, Seongnam-si (KR); Doo-yeon Lee, Yongin-si (KR); Seung-uk Son, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 365 days.

This patent is subject to a terminal disclaimer.

(21) Appl. No.: 13/016,317

(22) Filed: Jan. 28, 2011

(65) Prior Publication Data

US 2011/0195283 A1 Aug. 11, 2011

Related U.S. Application Data

(63) Continuation-in-part of application No. 12/828,537, filed on Jul. 1, 2010, now abandoned.

(30) Foreign Application Priority Data

Jan. 29, 2010 (KR) .................. 10-2010-0008597
Jan. 27, 2011 (KR) .................. 10-2011-0008251

(51) Int. Cl.
*H01M 8/20* (2006.01)
*H01M 4/36* (2006.01)
*H01M 10/056* (2010.01)
*H01B 1/08* (2006.01)

(52) U.S. Cl.
USPC .............. 429/105; 429/80; 429/107; 429/108; 429/109; 429/336; 429/339; 252/182.1; 252/364; 252/519.3

(58) Field of Classification Search
USPC .......... 429/80, 188, 199, 106, 107, 324, 336, 429/339, 105, 109; 252/182.1, 364, 519.3; 205/413, 422; 523/421; 524/98; 361/502

See application file for complete search history.

(56) References Cited

U.S. PATENT DOCUMENTS

| 4,382,116 | A | 5/1983 | Gahn et al. |
| 4,591,453 | A | 5/1986 | Kobayashi |
| 5,383,089 | A * | 1/1995 | Williams et al. .............. 361/502 |
| 2006/0063065 | A1 | 3/2006 | Clarke et al. |
| 2009/0047570 | A1* | 2/2009 | Harper ............................ 429/72 |

FOREIGN PATENT DOCUMENTS

JP    62-15770    1/1987

OTHER PUBLICATIONS

"Efficient and eco-friendly process for the synthesis of N-substituted 4-methylene-2-oxazolidinones in ionic liquids", Zhang et al., Tetrahedron Letters 45 (2005) p. 5907-5911. Jul. 11, 2005.*

"A rechargeable redox battery utilizing ruthenium complexes with non-aqueous organic electrolyte", Inoue et al., Journal of Applied Electrochemistry, 18 (1988) p. 909-914. Apr. 10, 1988.*

(Continued)

*Primary Examiner* — Kenneth Douyette
(74) *Attorney, Agent, or Firm* — Stein IP, LLC

(57) ABSTRACT

An organic electrolyte solution for use in a redox flow battery and the redox flow battery including the organic electrolyte solution has a high energy density because re-precipitation is prevented in the organic electrolyte solution or eduction is prevented in an electrode during reduction of a metal ion used as an electrolyte.

26 Claims, 13 Drawing Sheets

(56) References Cited

OTHER PUBLICATIONS

U.S. Appl. No. 12/828,551, filed Jul. 1, 2010, Hee-young Sun, et al., Samsung Electronics Co., Ltd.

U.S. Appl. No. 12/828,537, filed Jul. 1, 2010, Hee-young Sun, et al., Samsung Electronics Co., Ltd.

European Search Report issued Apr. 29, 2011, in corresponding European Application No. 11152617.4.

\* cited by examiner

ORGANIC ELECTROLYTE SOLUTION AND REDOX FLOW BATTERY INCLUDING THE SAME

CROSS-REFERENCE TO RELATED APPLICATIONS

This application is a Continuation-In-Part application of U.S. application Ser. No. 12/828,537, filed Jul. 1, 2010, now abandoned, and claims the benefit of Korean Patent Application No. 10-2010-0008597, filed Jan. 29, 2010 in the Korean Intellectual Property Office, and Korean Patent Application No. 10-2011-0008251, filed Jan. 27, 2011 in the Korean Intellectual Property Office, the disclosures of which are incorporated herein in their entirety by reference.

BACKGROUND

1. Field

Aspects of the present disclosure relate to organic electrolyte solutions and redox flow batteries including the same, and more particularly, to organic electrolyte solutions for batteries having high energy density, and redox flow batteries including the same.

2. Description of the Related Art

Secondary batteries are highly efficient energy storage systems widely used for small mobile phones and middle and large power storage devices. Specifically, secondary batteries are used as main core parts in semiconductor and liquid crystal devices, acoustic devices, and information and communication devices (such as mobile phones and laptops). More recently, secondary batteries have started to be used as power sources in hybrid cars.

Such power storage systems require a stable energy supply and a high energy conversion efficiency. Recently, redox flow batteries have come into the spotlight as secondary batteries having a large capacity and high durability, which are most suitable for large power storage systems. Unlike other batteries, an active material of the redox flow batteries exists as ions in an aqueous state instead of a solid state. The redox flow batteries use a mechanism of storing and generating electric energy according to oxidation/reduction reaction of each ion in a cathode and an anode.

In other words, the redox flow batteries include an electrolyte solution. An active material of an electrode is dissolved in a solvent. The cathode is oxidized and the anode is reduced when the redox flow battery including a catholyte and an anolyte having different oxidation states is charged, and the electromotive force of the redox flow battery is determined by a difference between standard electrode potentials ($E^0$) of a redox couple forming the catholyte and the anolyte. Meanwhile, the catholyte and anolyte are supplied from respective electrolyte solution tanks by a pump. The redox flow batteries simultaneously have a quick oxidation and reduction reaction rate on the surfaces of the cathodes and anodes like general batteries, and have large power characteristics like fuel cells.

SUMMARY

Aspects of the present invention include organic electrolyte solutions for redox flow batteries having large energy density.

Aspects of the present invention include redox flow batteries including the organic electrolyte solutions.

According to an aspect of the present invention, an organic electrolyte solution includes: a solvent; and an electrolyte, wherein the electrolyte is a metal-ligand coordination compound that has at least two electrons being transferred during oxidation-reduction, and is dissolved in an electrolyte solution while the metal-ligand coordination compound is in an atomic state with zero oxidation.

According to an aspect of the present invention, a metal in the metal-ligand coordination compound may be at least one type selected from the group consisting of nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb) and vanadium (V).

According to an aspect of the present invention, a ligand in the metal-ligand coordination compound may be at least one selected from the group consisting of dipyridyl, terpyridyl, ethylene diamine, propylene diamine, phenanthroline, and N-heterocyclic carbon (NHC).

According to an aspect of the present invention, the metal-ligand coordination compound may perform a reversible oxidation-reduction reaction.

According to another aspect of the present invention, a redox flow battery includes: a cathode cell including a cathode and a catholyte; an anode cell including an anode and an anolyte; and an ion exchange membrane disposed between the cathode cell and the anode cell, wherein at least one of the catholyte and the anolyte is an organic electrolyte solution according to above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
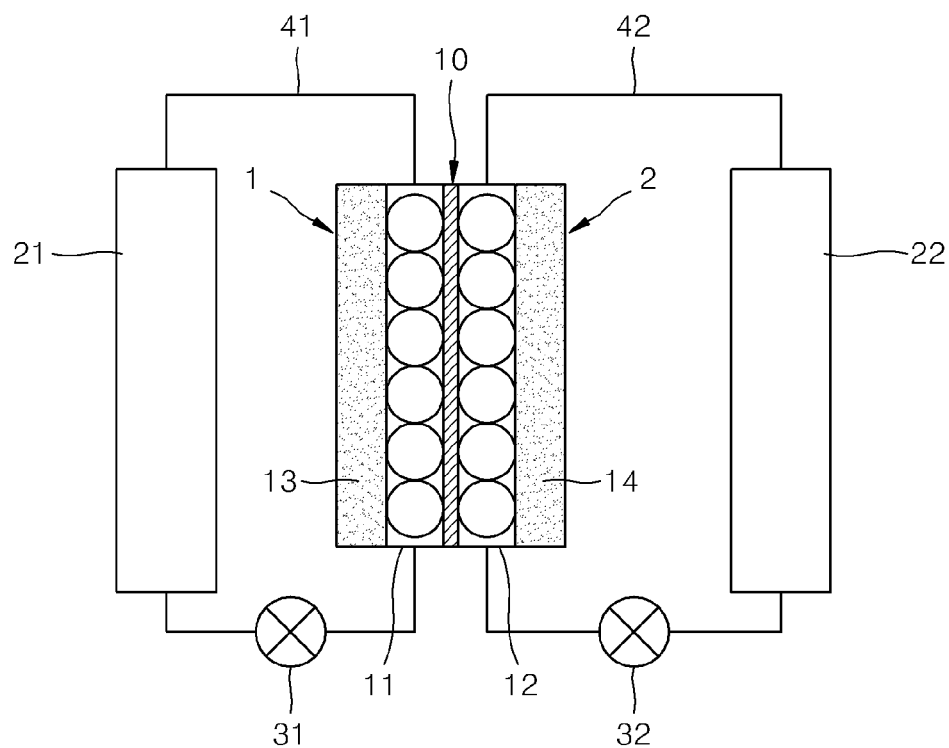
FIG. 1 is a diagram schematically illustrating a redox flow battery according to an aspect of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram schematically illustrating a general redox flow battery according to an aspect of the invention. As shown in FIG. 1, the redox flow battery includes a cathode cell 1 and an anode cell 2. The cathode cell 1 is separated from the anode cell 2 by an ion exchange membrane 10. The cathode cell 1 includes a cathode 13. The anode cell 2 includes an anode 14. The cathode cell 1 is connected to a cathode tank 21 for providing and discharging a catholyte 11 through a pipe 41. Similarly, the anode cell 2 is connected to an anode tank 22 for supplying and discharging an anolyte 12 through a pipe 42. The catholyte 11 and the anolyte 12 respectively circulate through pumps 31 and 32. Charging and discharging occur in the cathode 13 and the anode 14 according to a change of oxidation states of ions.

The ion exchange membrane 10 prevents ions of active materials of the catholyte 11 and the anolyte 12 from being mixed with each other, and permits only ions of a charge carrier of a supporting electrolyte to be transferred.

The redox battery of FIG. 1 utilizes an organic electrolyte solution according to an embodiment of the present invention, which includes a solvent and an electrolyte. The electrolyte is a metal-ligand coordination compound. The metal-ligand coordination compound is stable since at least two electrons are transferred during oxidation-reduction, and it is dissolved in an electrolyte solution in an atom state with zero oxidation.

The redox flow battery is discharged by connecting it to an external circuit including an electric load (not shown) and supplying a current to the external circuit. The redox flow battery is charged by connecting it to an external power source (not shown) and supplying a current to the redox flow battery.

Generally, a catholyte is charged when a redox couple is oxidized to a higher one of two oxidation states, and is discharged when reduced to a lower one of the two oxidation state. In contrast, an anolyte is charged when a redox couple is reduced to a lower one of two oxidation states, and is discharged when oxidized to a higher one of the two oxidation states.

Cathode $$C^n \rightarrow C^{n-y} + ye^- \text{(Charge)}$$

$$C^{n-y} + ye^- \rightarrow C^n \text{(Discharge)}$$

(C: Catholyte)

Anode $$A^{n-x} + xe^- \rightarrow A^n \text{(Charge)}$$

$$A^n \rightarrow A^{n-x} + xe^- \text{(Discharge)}$$

(A: Anolyte)

Since a working potential of a general redox flow battery using an aqueous solvent is limited to a water-decomposition potential area, the general redox flow battery has a low operating voltage, and thus has low energy density. Accordingly, a non-aqueous solvent may be used. However, a general electrolyte has low solubility with respect to the non-aqueous solvent and may be educed while a metal ion is reduced. Thus, desired energy density may not be obtained, and a cell life may be decreased since charge and discharge irreversible capacity is accumulated as the number of cycles is increased.

Accordingly, the organic electrolyte solution according to an embodiment of the present invention includes an electrolyte containing the metal-ligand coordination compound that has at least two electrons being transferred during oxidation-reduction and is stable in the electrolyte solution in an atom state with zero oxidation. This means that the metal-ligand coordination compound with zero oxidation is dissolved in a solvent, such as a non-aqueous solvent, without being precipitated or educed.

A metal stable in the electrolyte solution with zero oxidation may be at least one type selected from the group consisting of nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb) and vanadium (V). In particular, the metal may be Ni.

A ligand in the metal-ligand coordination compound may unlimitedly use an aromatic ligand or an aliphatic ligand.

The ligand in the metal-ligand coordination compound may be at least one type selected from the group consisting of dipyridyl, terpyridyl, ethylene diamine, propylene diamine, phenanthroline, and N-heterocyclic carbon (NHC). Examples of the NHC include 2,6-bis(methylimidazole-2-ylidene)pyridine, 1,3-dimesitylimidazole, 1,3-bis(2,5-diisopropylphenyl)imidazole, 1,3-dimethylimidazole, 1,3-di-tert-buthylimidazole, 1,3-dicyclohexylimidzole, and 1-ethyl-3-methylimidazole.

The metal-ligand coordination compound may perform reversible oxidation-reduction reaction. Examples of the metal-ligand coordination compound may include:

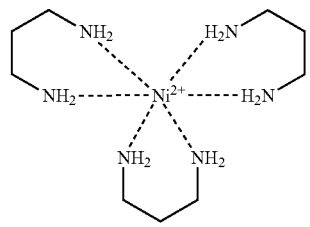

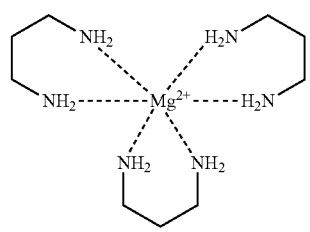

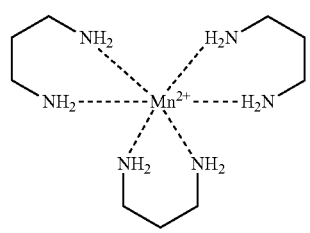

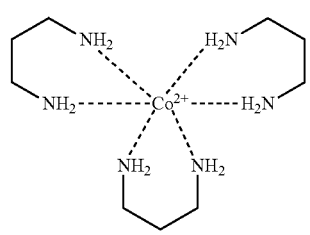

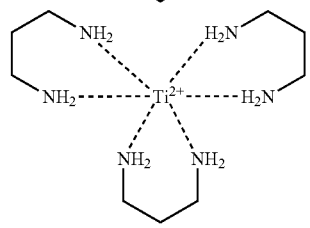

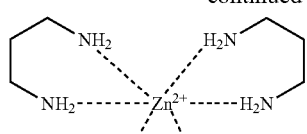
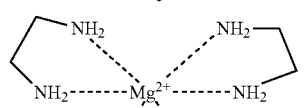
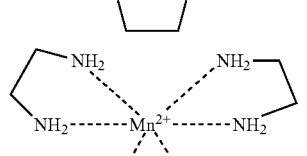
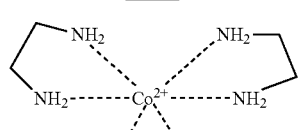
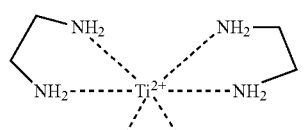
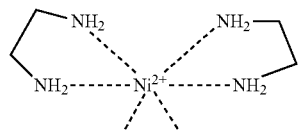
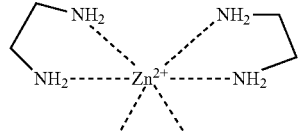
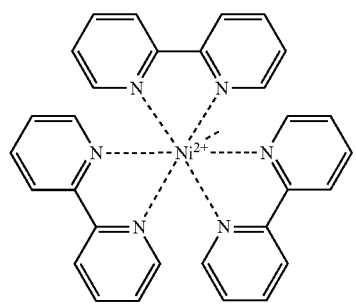
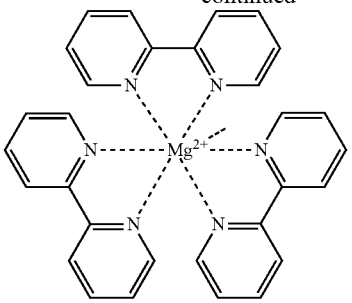
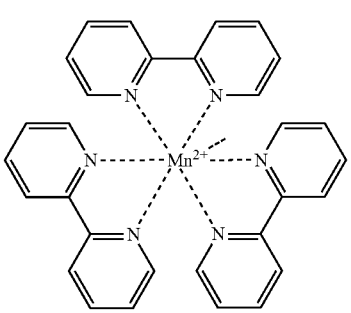
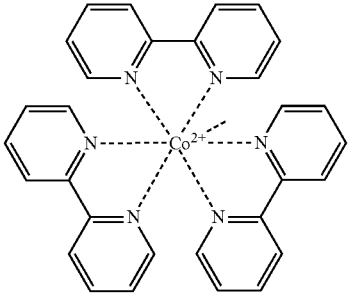
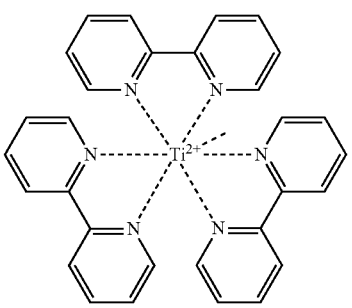
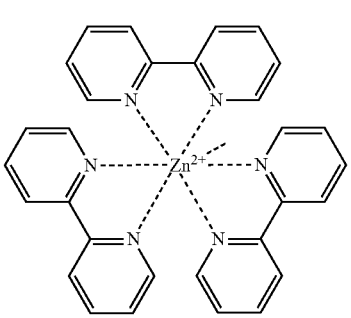

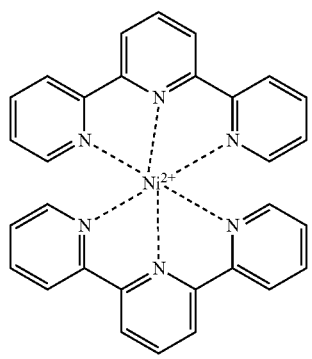
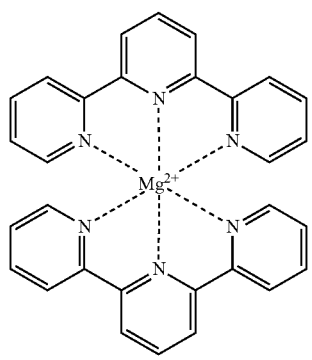
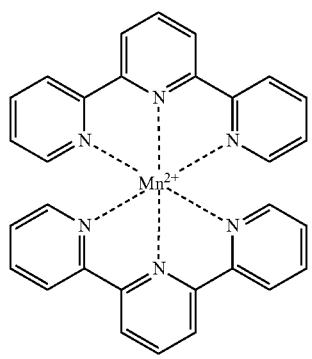
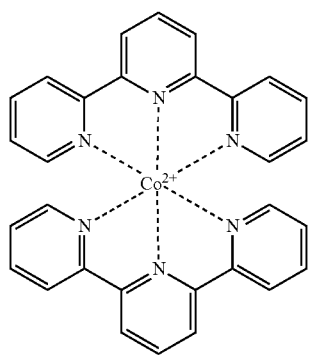
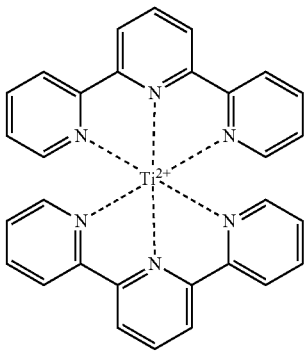
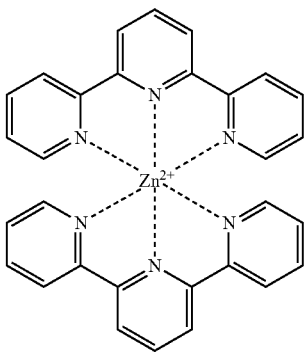
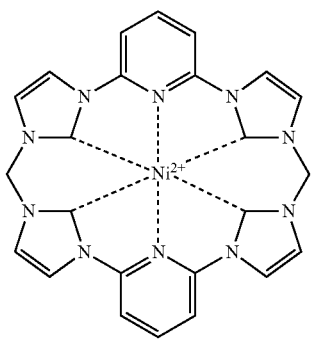
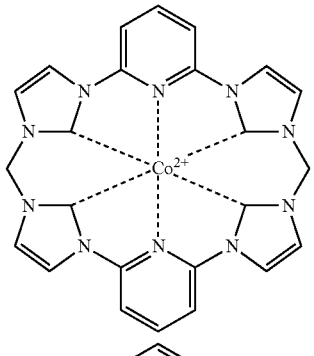
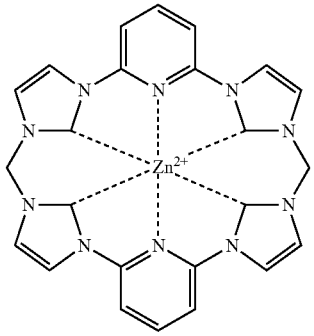

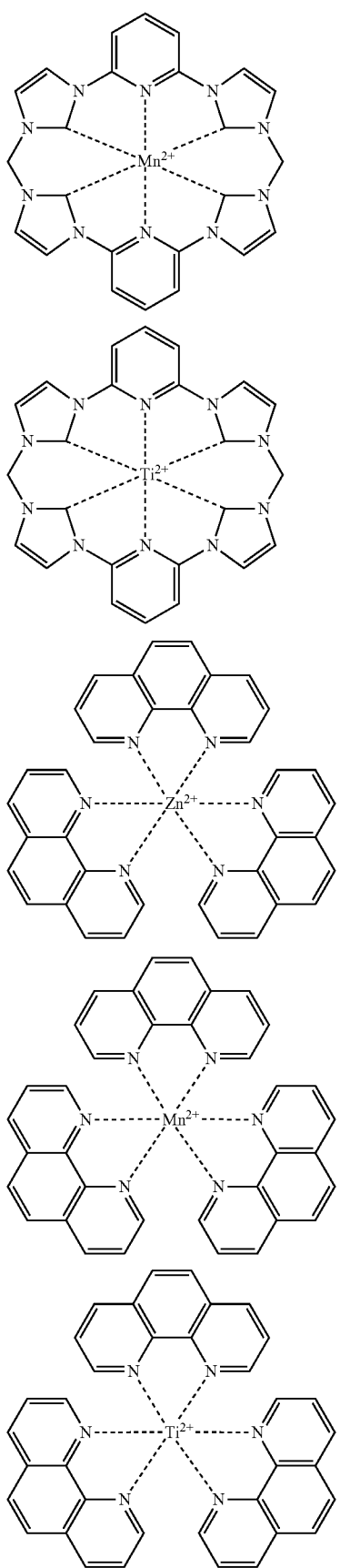
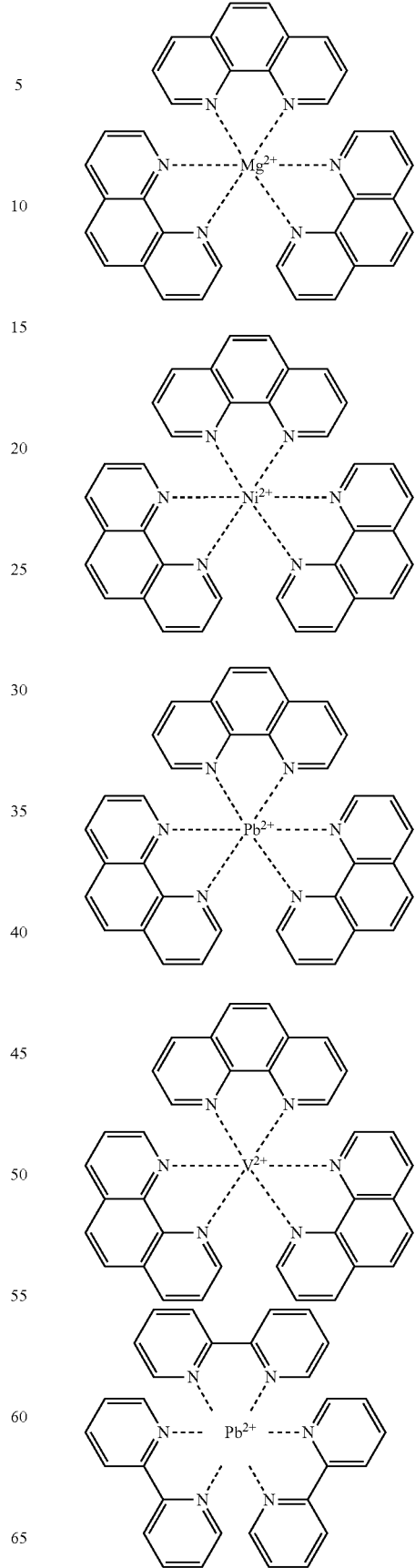

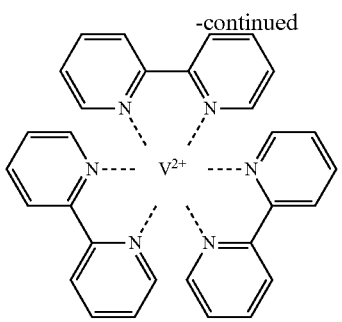

Examples of the metal-ligand coordination compound include Ni-phenanthroline, Ni-bipyridine, and Ni-[2,6-bis(methylimidazole-2-ylidene)pyridine.

The metal-ligand coordination compound may exist in the electrolyte solution at concentration of 0.1 M to 3 M. When the concentration is within the above range, storage characteristics of a battery may be shown.

A counter anion of the metal-ligand coordination compound may be $BF_4^-$, $PF_6^-$, $CF_3SO_3^-$, or $(CF_3SO_2)_2N^-$.

The solvent may be an aqueous solvent, a non-aqueous solvent, an ionic liquid or a mixture thereof.

Examples of the aqueous solvent include $H_2SO_4$, HCl, $H_3PO_4$, methane sulfonic acid, or a mixture thereof.

Examples of the non-aqueous solvent include dimethyl acetamide, diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, N,N-dimethylacetamide or a mixture thereof.

Examples of the ionic liquid include 1-butyl-3-methylimidazolium tetrafluoroborate ($IMIBF_4$), 1-butyl-3-methylimidazolium hexafluorophosphate (IMIPF6), 1-butyl-4-methylpyridinium tetrafluoroborate (PyBF4), N-methyl-N-propylpiperidinium bis(trifluoromethane sulfonyl) imide (PP13-TFSI), 1-ethyl-3-methlyimidazolium tetrafluoroborate ($EMIBF_4$) or a mixture thereof.

The redox flow battery according to an embodiment of the present invention shown in FIG. 1 includes the cathode cell 1 including the cathode 13 and the catholyte 11, the anode cell 2 including the anode 14 and the anolyte 12, and the ion exchange membrane 10 disposed between the cathode cell 1 and the anode cell 2. The catholyte 11 and the anolyte 12 include the organic electrolyte solution described above.

According to an embodiment of the present invention, one of the catholyte 11 and the anolyte 12 may be an organic electrolyte solution including an electrolyte formed of a metal-ligand coordination compound that is stable in an electrolyte solution while the metal-ligand coordination compound has zero oxidation and having at least two electrons being transferred during oxidation-reduction. In other words, when one of the catholyte 11 and the anolyte 12 includes the electrolyte formed of the metal-ligand coordination compound that is stable in the electrolyte solution while the metal-ligand coordination compound has zero oxidation and having at least two electrons being transferred during oxidation-reduction, the other may include any well known electrolyte.

At least one of the catholyte 11 and the anolyte 12 may include the metal-ligand coordination compound that performs reversible oxidation-reduction reaction. The catholyte and the anolyte may include a redox couple of $Fe^{2+}/Ni^0$ or $Ru^{2+}/Ni^0$.

While not required in all aspects, the shown redox flow battery further includes the catholyte tank 21 and an anolyte tank 22 respectively connected to the cathode cell 1 and the anode cell 2 to transfer fluid.

The ion exchange membrane 10 may be any well known ion exchange membrane used in general redox flow batteries. A cation exchange membrane may be used and may be a cation exchange membrane obtained by sulfonating a styrene-divinylbenzene copolymer, a cation exchange membrane introducing a sulfonic acid group by using a copolymer of tetrafluoroethylene and perfluoro sulfonylethoxyvinylether as a base, a cation exchange membrane formed of a copolymer of tetrafluoroethylene and a perfluoro vinylether having a carboxyl group at a side chain, or a cation exchange membrane introducing a sulfonic acid group by using a aromatic polysulfone copolymer as a base.

The redox flow battery is suitable for an electric vehicle that requires a high capacity and large power, and may also be used for a hybrid vehicle by being connected to a general internal combustion engine, a fuel cell, or a super capacitor. In addition, the redox flow battery may be used for other devices that require a large output and high voltage, such as for power plants or to store energy from green power sources (such as wind or solar power sources) for later use or sale. However, the invention is not limited thereto.

Aspects of the present invention will be described in greater detail with reference to the following examples. The following examples are for illustrative purposes only and are not intended to limit the scope of the invention.

Preparation Example 1

$Fe^{2+}$-(Phen)$_3$[$BF_4$]$_2$—Transfer of One Electron 2.692 g of $FeSO_4.6H_2O$ and 30 ml of methanol were put into a 100 ml round-bottom flask, and were stirred for 5 to 20 minutes to obtain a $FeSO_4.6H_2O$ solution. 5.767 g of phenanthroline and 60 ml of methanol were put into a separate 50 ml round-bottom flask, and were stirred for 5 to 10 minutes to obtain a phenanthroline solution. The phenanthroline solution was slowly added to the $FeSO_4.6H_2O$ solution and then was stirred until the color of a mixed solution changed from dark blue to purple to pink. Then, 5.490 g of $NaBF_4$ was added to the pink mixed solution, and then stirred for at least 30 minutes. Next, the result product was filtered, washed with water and methanol several times, and then dried in vacuum so as to obtain 3.456 g of $Fe^{2+}$-(Phen)$_3$[$BF_4^-$]$_2$.

Preparation Example 2

$Ni^{2+}$-(Phen)$_3$[$BF_4$]$_2$—Transfer of Two Electrons 7.15 g of $Ni^{2+}$-(Phen)$_3$[$BF_4$]$_2$ was obtained in the same manner as in Preparation Example 1, except that 2.692 g of $NiSO_4.6H_2O$ was used instead of 2.692 g of $FeSO_4.6H_2O$.

Preparation Example 3

$Ni^{2+}$-[2,6-bis(methyl imidazole-2-ylidene)pyridine]$_2$ [$PF_6$]$_2$—Transfer of Two Electrons 1 g of 2,6-bis(methyl imidazole-2-ylidene)pyridine, 0.673 g of potassium tert-butoxide, and 20 ml of dioxane were put into a 50 ml round-bottom flask, and then was stirred for 30 minutes to obtain a mixed solution. 0.264 g of $NiSO_4.6H_2O$ was added to the mixed solution, and was refluxed for 4 hours at 110° C. The refluxed solution was cooled down, and stirred after adding 1 g of $NH_4PF_6$ (in methanol). Then, the result product was filtered, washed with water and ether several times, and then dried in vacuum to obtain 0.674 g of $Ni^{2+}$-[2, 6-bis(methyl imidazole-2-ylidene)pyridine]$_2$[$PF_6$]$_2$.

Preparation Example 4

$Fe^{3+}$-[2,6-bis(methyl imidazole-2-ylidene)pyridine]$_2$ [$PF_6$]$_2$—Transfer of One Electron 0.8 g of 2,6-bis(methyl imidazole-2-ylidene)pyridine and 20 ml of ethylene glycol were put into a 50 ml round-bottom flask, and stirred for 30 minutes to obtain a mixed solution. Then, 0.270 g of $FeCl_3.6H_2O$ was added to the mixed solution, and refluxed for 4 hours at 2000° C. The refluxed solution was cooled down, and then stirred after adding 1 g of $NH_4PF_6$ (in methyl alcohol). The result product was filtered, washed with water and ether several times, and then dried in vacuum to obtain 0.802 g of $Ni^{2+}$-[2,6-bis(methyl imidazole-2-ylidene)pyridine]$_2$[$PF_6$]$_2$.

Preparation Example 5

$Co^{2+}$-(Phen)$_3$[$BF_4$]$_2$—Transfer of One Electron 5.22 g of $Co^{2+}$-(Phen)$_3$[$BF_4$]$_2$ was obtained in the same manner as in Preparation Example 1, except that 4.216 g of $CoSO_4.7H_2O$ was used instead of 2.692 g of $FeSO_4.6H_2O$.

Preparation Example 6

$Ru^{2+}$-[2,6-bis(methyl imidazole-2-ylidene)pyridine]$_2$ [$PF_6$]$_2$—Transfer of One Electron 0.56 g of 2,6-bis(methyl imidazole-2-ylidene)pyridine and 10 ml of ethylene glycol were put into a 100 ml round-bottom flask, and stirred for 30 minutes to obtain a mixed solution. 0.1 g of $RuCl_3.6H_2O$ was added to the mixed solution, and then refluxed for 4 hours at 2000° C. 100 ml of methanol and 30 ml of water were put into the refluxed solution, and then 2 g of $NH_4PF_6$ (in water/methanol (10:3)) was further added thereto, and then stirred. The result product was filtered, washed with water and ether several times, and then dried in vacuum to obtain 0.31 g of $Ni^{2+}$-[2,6-bis(methyl imidazole-2-ylidene)pyridine]$_2$[$PF_6$]$_2$.

Preparation Example 7

$Ni^{2+}$-(bpy)$_3$[BF4]$_2$—Transfer of Two Electrons 7.99 g (23.48 mmol) of $Ni(BF_4)_2.6H_2O$ was put into a 100 ml round-bottom flask, 50 ml of ethanol was added thereto, and then the 100 ml round-bottom flask was stirred for 20 minutes to obtain a first solution. Also, 11 g (70.43 mmol) of bipyridine was put into another 100 ml round-bottom flask, 90 ml of ethanol was added thereto, and then the 100 ml round-bottom flask was stirred for 10 minutes to obtain a second solution.

The second solution was slowly added to the first solution and, and the mixed solution thereof was stirred for 2.5 hours at room temperature until a color of the mixed solution changed from green to pink. The result product was filtered, washed with water and 150 ml of ethanol three times, naturally dried, and then dried in a vacuum oven to obtain 15.09 g (91.7%) pink solid.

Preparation Example 8

$Fe^{2+}$-(bpy)$_3$[BF4]$_2$—Transfer of One Electron 15.24 g (29.88 mmol) of $Fe(BF_4)_2.6H_2O$ was out into a 100 ml round-bottom flask, 50 ml of ethanol was added thereto, and then the 100 ml round-bottom flask was stirred for 20 minutes to obtain a first solution.

Also, 14 g (89.64 mmol) of bipyridine was put into another 100 ml round-bottom flask, 80 ml of ethanol was added thereto, and then the 100 ml round-bottom flask was stirred for 10 minutes to obtain a second solution.

The second solution was slowly added to the first solution and, and the mixed solution thereof was stirred for 3 hours at room temperature until a color of the mixed solution simultaneously becomes red. The result product was filtered, washed with water and 150 ml of ethanol three times, naturally dried, and then dried in a vacuum oven to obtain 16.632 g (79.7%) pink solid.

Cyclic Voltammetry

A current value according to potential was measured for 20 cycles by using electrolytes obtained according to Preparation Examples 1 through 8, at a potential scan rate of 100 mV/s and in a potential scan range of about –0.2 V to about 1.5 V in the case of the $Fe(Phen)_3(BF_4)_2$, about –2.1 V to about –1.2 V in the case of the $Ni(Phen)_3(BF_4)_2$, about –0.6 V to about –2.5 V in the case of Ni[2,6-bis(methyl imidazole-2-ylidene)pyridine]$_2$($PF_6$)$_2$, about –0.7 V to about 0.4 V in the case of Fe[2,6-bis(methyl imidazole-2-ylidene)pyridine]$_2$ ($PF_6$)$_2$, about –0.2 V to about 1.6 V in the case of $Co(Phen)_3$ ($BF_4$)$_2$, and about –0.4 V to about 1.7 V in the case of Ru[2, 6-bis(methyl imidazole-2-ylidene)pyridine]$_2$($PF_6$)$_2$, about –1.77 V to –1.65 V in the case of $Ni(bpy)_3(BF_4)_2$, and about –1.65 V to 0.65 V in the case of $Fe(bpy)_3(BF_4)_2$. A cell for measuring a cyclic voltammogram included an $Ag/Ag^+$ electrode, in which 0.3 M of $AgNO_3$ was dissolved in a solvent of acetonitrile, as a reference electrode, carbon felt as a working electrode, and platinum as a counter electrode.

Figure 2A:
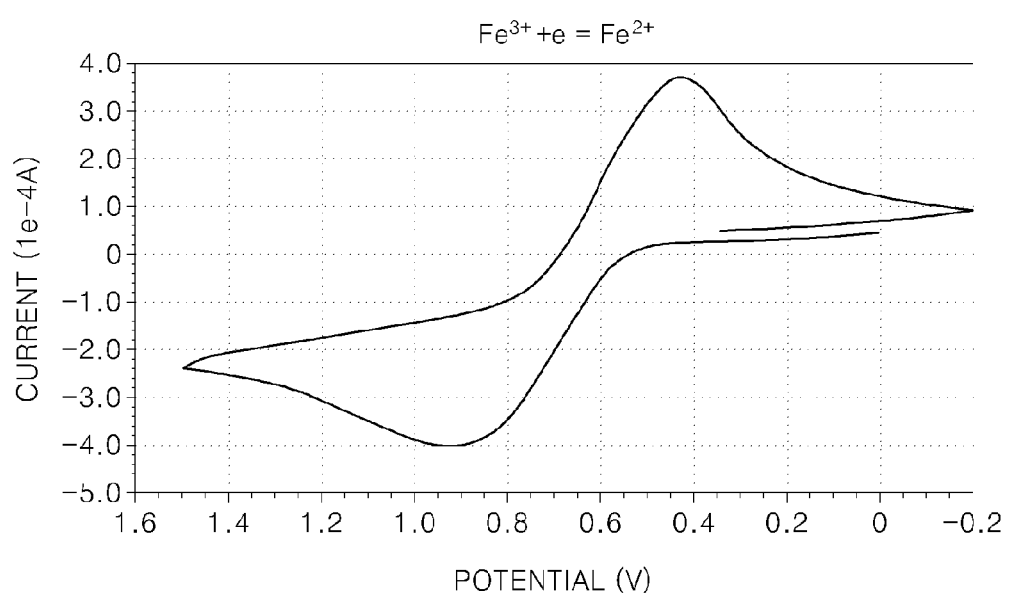
FIGS. 2A through 2H are cyclic voltammograms of organic electrolyte solutions respectively including electrolytes obtained according to Preparation Examples 1 through 8 according to an aspect of the invention.
Figure 2B:
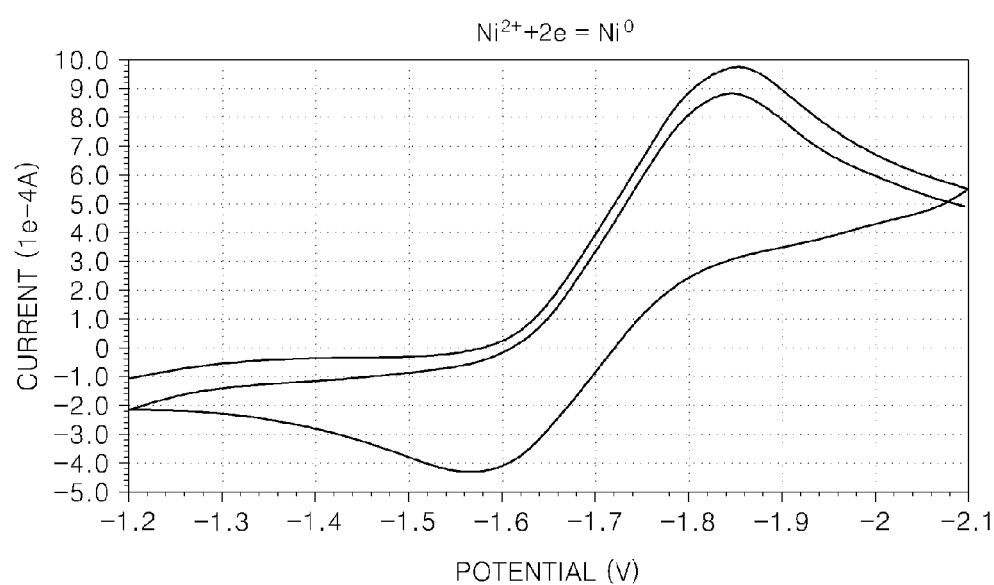
Figure 2C:
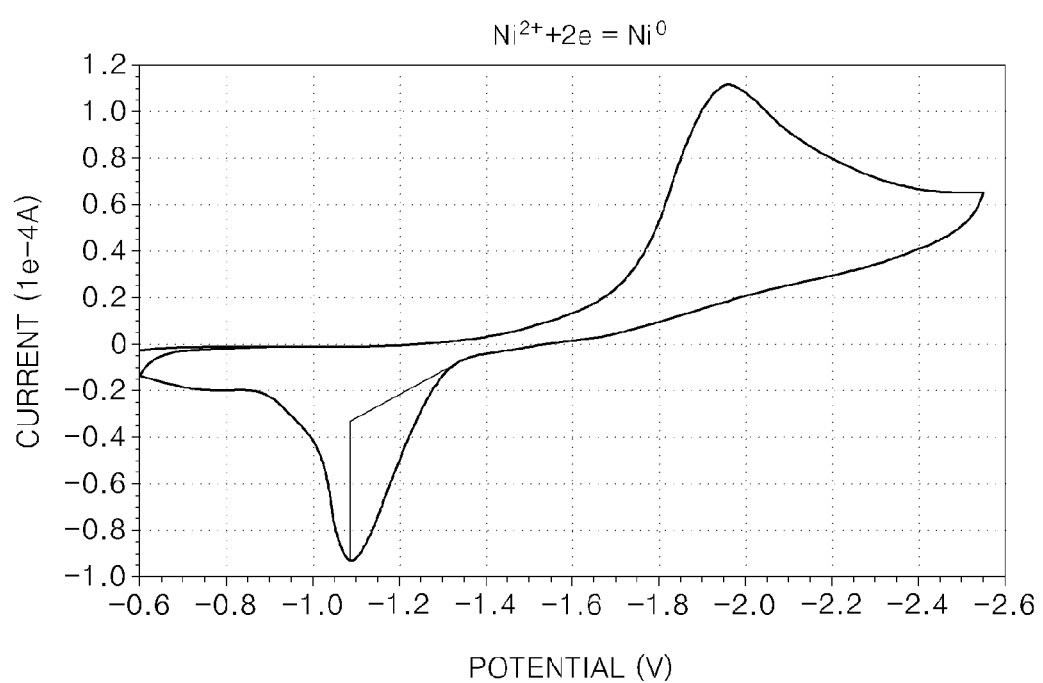
Figure 2D:
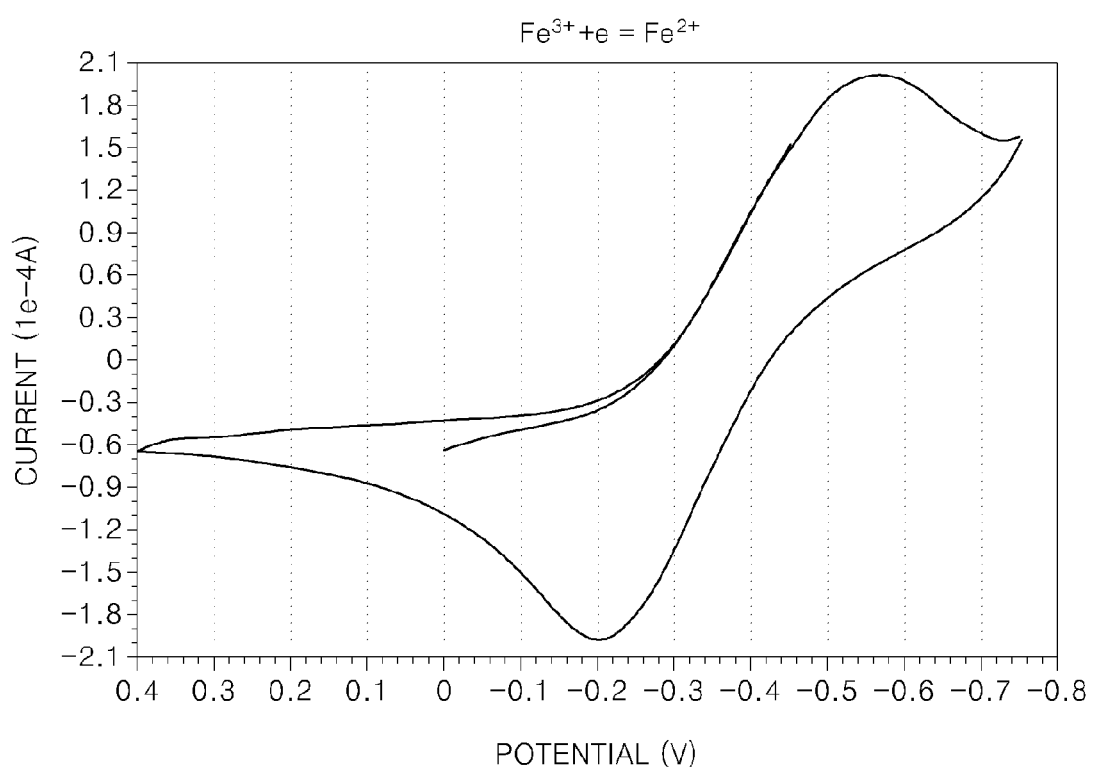
Figure 2E:
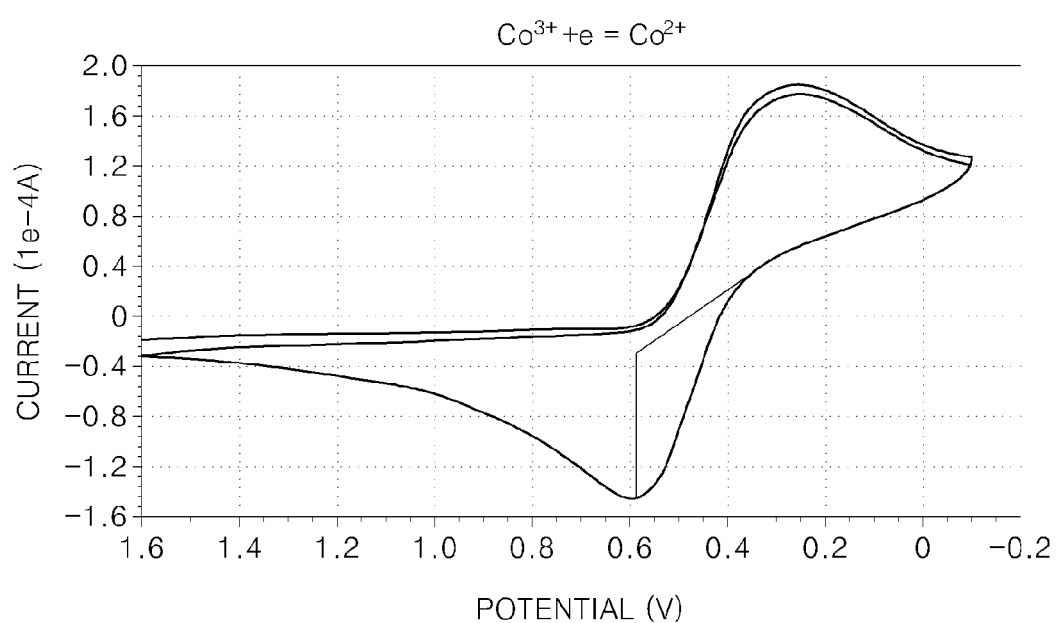
Figure 2F:
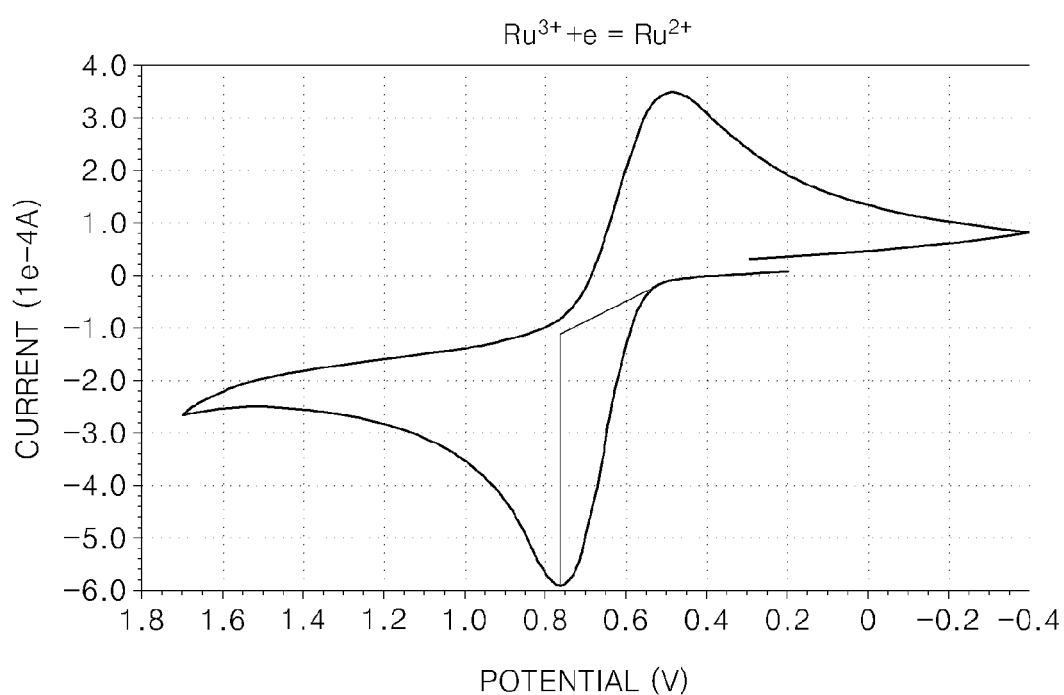
Figure 2G:
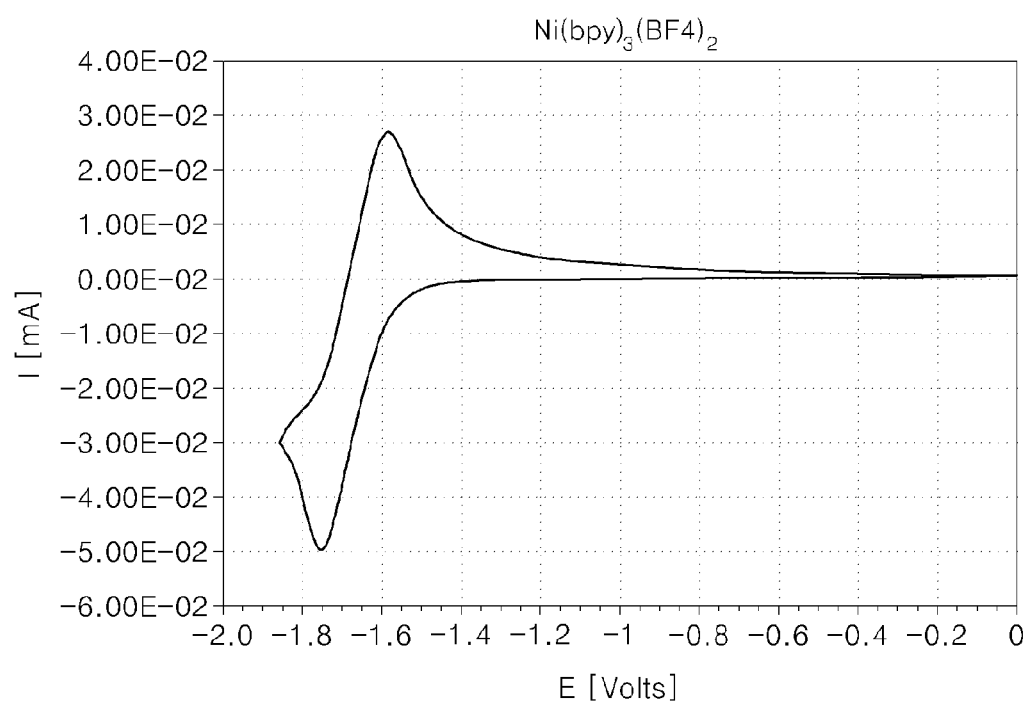
Figure 2H:
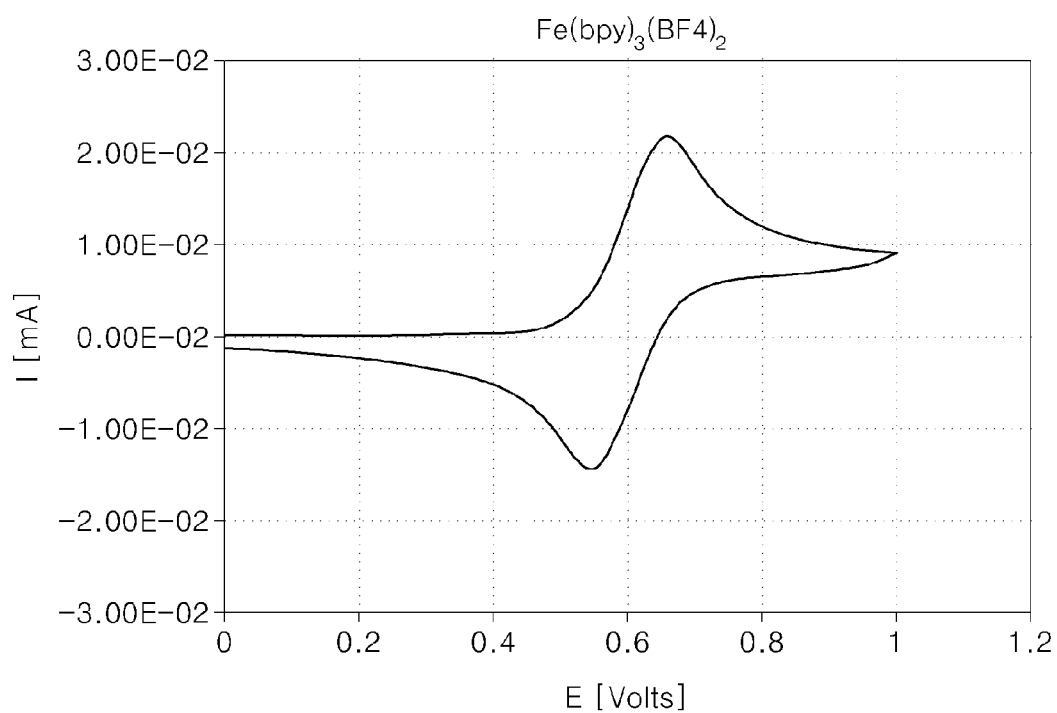

The results of measuring the current values are shown in FIGS. 2A through 2H respectively corresponding to Preparation Examples 1 through 8. As shown in FIGS. 2A through 2H, the electrolytes including the metal-ligand coordination compound according to an embodiment of the present invention are stably dissolved in the electrolyte solution without being educed. Also, a peak current of $Ni(Phen)_3(BF_4)_2$ of FIG. 2B is at least twice a peak current of $Fe(Phen)_3(BF_4)_2$ of FIG. 2A, which means that Ni shows a redox reaction transferring two electrons, and Fe shows a redox reaction transferring one electron. Also, in the metal-ligand coordination compound, even when $Ni^{2+}$ is reduced to a metal atom by receiving two electrons, the metal-ligand coordination compound is stable in the electrolyte solution. In other words, considering that the peak current does not decrease for 20 cycles, even when an Ni ion is reduced to zero oxidation, the metal-ligand coordination compound is stable in the electrolyte solution without precipitation or eduction.

Also, the electrolyte of Ni[2,6-bis(methyl imidazole-2-ylidene)pyridine]$_2$ ($PF_6$)$_2$ is reversible in an oxidation-reduction reaction, and thus a redox flow battery may be manufactured by using $Fe(Phen)_3BF_4$ or $Ru^{2+}$[2,6-bis(methyl imidazole-2-ylidene)pyridine]$_2BF_4$ as a catholyte.

Example 1

Charging was performed by using 0.6 M $Fe(Phen)_3(BF_4)_2$ dissolved in 5 ml of GBL as a catholyte and 0.3 M Ni(Phen)$_3BF_4$ dissolved in 5 ml of GBL as an anolyte.

A carbon felt electrode was prepared by thermal-processing carbon felt (Nippon Graphite, GF20-3, t=3 mm, A=5×5 cm$^2$) for 5 hours at 500° C. under an air atmosphere, and a non-flow type battery was prepared as follows. A Na conductive Nafion membrane (Product Name: Nafion 117, manufactured by Dupont) was used as an ion exchange membrane.

An insulator, a current collector, and a bipolar plate were stacked on a nut-integrated end plate in the stated order. The 5×5 cm² square carbon felt electrode was cut into halves to obtain two rectangular carbon felt electrodes, and the rectangular carbon felt electrodes were inserted into a concave portion of each of two of the bipolar plates stacked as above.

3 ml of each of the catholyte and anolyte prepared above were respectively injected into the positive carbon felt electrode and the negative carbon felt electrode prepared according to the above method, and then the positive and negative carbon felt electrodes were assembled. A bolt inserted into a disk spring was tightened in a diagonal order up to 1.5 Nm by using a torque wrench. Next, the remaining catholyte and anolyte were injected into a respective injection hole of each of the positive and negative carbon felt electrodes, and then the injection hole was closed with a Teflon bolt. The Teflon bolt having a gas leak hole was used for each bipolar plate.

Example 2

A redox flow battery was prepared in the same manner as in Example 1, except that Ni[2,6-bis(methyl imidazole-2-ylidene)pyridine]$_2$(PF$_6$)$_2$ was used instead of Ni(Phen)$_3$(BF$_4$)$_2$.

Example 3

A redox flow battery was prepared in the same manner as in Example 1, except that Ru[2,6-bis(methyl imidazole-2-ylidene)pyridine]$_2$(PF$_6$)$_2$ was used instead of Fe(Phen)$_3$(BF$_4$)$_2$.

Example 4

A redox flow battery was prepared in the same manner as in Example 1, except that Ru[2,6-bis(methyl imidazole-2-ylidene)pyridine]$_2$(PF$_6$)$_2$ was used instead of Fe(Phen)$_3$(BF$_4$)$_2$, and Ni[2,6-bis(methyl imidazole-2-ylidene)pyridine]$_2$(PF$_6$)$_2$ was used instead of Ni(Phen)$_3$(BF$_4$)$_2$.

Example 5

A redox flow battery was prepared in the same manner as in Example 1, except that Fe(bpy)$_3$(BF$_4$)$_2$ was used instead of Fe(Phen)$_3$(BF$_4$)$_2$, and Ni(bpy)$_3$(BF$_4$)$_2$ was used instead of Ni(Phen)$_3$(BF$_4$)$_2$.

Comparative Example 1

A redox flow battery was prepared in the same manner as in Example 1, except that Fe[2,6-bis(methyl imidazole-2-ylidene)pyridine]$_2$(PF$_6$)$_2$ was used instead of Ni(Phen)$_3$(BF$_4$)$_2$.

Comparative Example 2

A redox flow battery was prepared in the same manner as in Example 1, except that Co(Phen)$_3$(BF$_4$)$_2$ was used instead of Ni(Phen)$_3$(BF$_4$)$_2$.

Comparative Example 3

A redox flow battery was prepared in the same manner as in Example 1, except that Ru[2,6-bis(methyl imidazole-2-ylidene)pyridine]$_2$(PF$_6$)$_2$ was used instead of Fe(Phen)$_3$(BF$_4$)$_2$ and Fe[2,6-bis(methyl imidazole-2-ylidene)pyridine]$_2$(PF$_6$)$_2$ was used instead of Ni(Phen)$_3$(BF$_4$)$_2$.

Comparative Example 4

A redox flow battery was prepared in the same manner as in Example 1, except that Ru[2,6-bis(methyl imidazole-2-ylidene)pyridine]$_2$(PF$_6$)$_2$ was used instead of Fe(Phen)$_3$(BF$_4$)$_2$, and Co(Phen)$_3$(BF$_4$)$_2$ was used instead of Ni(Phen)$_3$(BF$_4$)$_2$.

Comparative Example 5

A catholyte and an anolyte were respectively prepared by preparing 1 M V$^{2+}$ and V$^{5+}$ solutions respectively from aqueous solutions having compositions of 1M VOSO$_4$ (Aldrich, 97% hydrate) and 2M H$_2$SO$_4$ (Aldrich 96% solution). Carbon felt (Nippon Graphite, GF20-3, t=3 mm, A=5×5 cm²) was used as an electrode, and Nafion 117 substituted with a hydrogen ion was used as an ion exchange membrane. A method and an order of assembling an all vanadium redox flow battery were identical to those described with respect to Example 1.

Charge and Discharge Evaluation (Non-Flow Type Battery)

A charge and discharge test was performed on the batteries prepared according to Examples 1 through 4 and Comparative Examples 1 through 5, at the room temperature of about 25° C. Each battery was charged up to 2.6 V with a constant current of 10 mA, and was discharged up to 0.8 V with a constant current of 5 mA. Such charging and discharging were repeated 6 times. The results of charging and discharging are shown in Table 1 below.

TABLE 1

| | Catholyte | Anolyte | OCV (V) |
|---|---|---|---|
| Example 1 | Fe-Phen | Ni-Phen | 2.3 |
| Example 2 | Fe-Phen | Ni-[2,6-bis(methyl imidazole-2-ylidene)pyridine] | 2.2 |
| Example 3 | Ru-[2,6-bis(methyl imidazole-2-ylidene)pyridine] | Ni-Phen | 2.4 |
| Example 4 | Ru-[2,6-bis(methyl imidazole-2-ylidene)pyridine] | Ni-[2,6-bis(methyl imidazole-2-ylidene)pyridine] | 2.3 |
| Example 5 | Fe-bpy | Ni-bpy | 2.35 |
| Comparative Example 1 | Fe-Phen | Fe-[2,6-bis(methyl imidazole-2-ylidene)pyridine] | 1.0 |
| Comparative Example 2 | Fe-Phen | Co-Phen | 1.95 |
| Comparative Example 3 | Ru-[2,6-bis(methyl imidazole-2-ylidene)pyridine] | Fe-[2,6-bis(methyl imidazole-2-ylidene)pyridine] | 1.1 |
| Comparative Example 4 | Ru-[2,6-bis(methyl imidazole-2-ylidene)pyridine] | Co-Phen | 2.05 |
| Comparative Example 5 | V | V | 1.5 |

Figure 4:
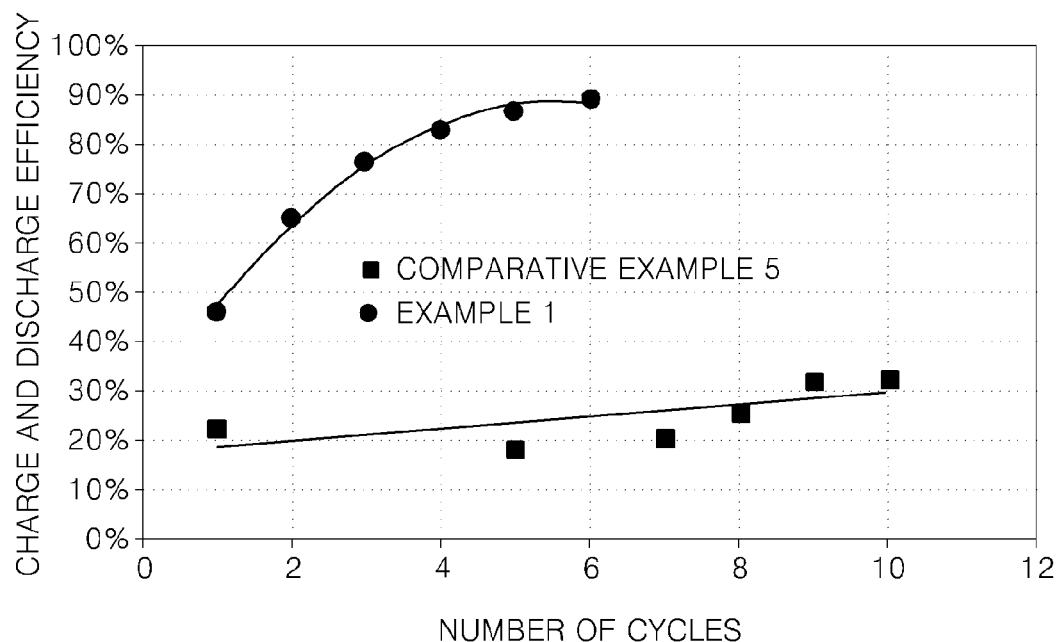
FIG. 4 is a graph showing charge and discharge efficiencies of the batteries of Example 1 and Comparative Example 5.
Figure 5:
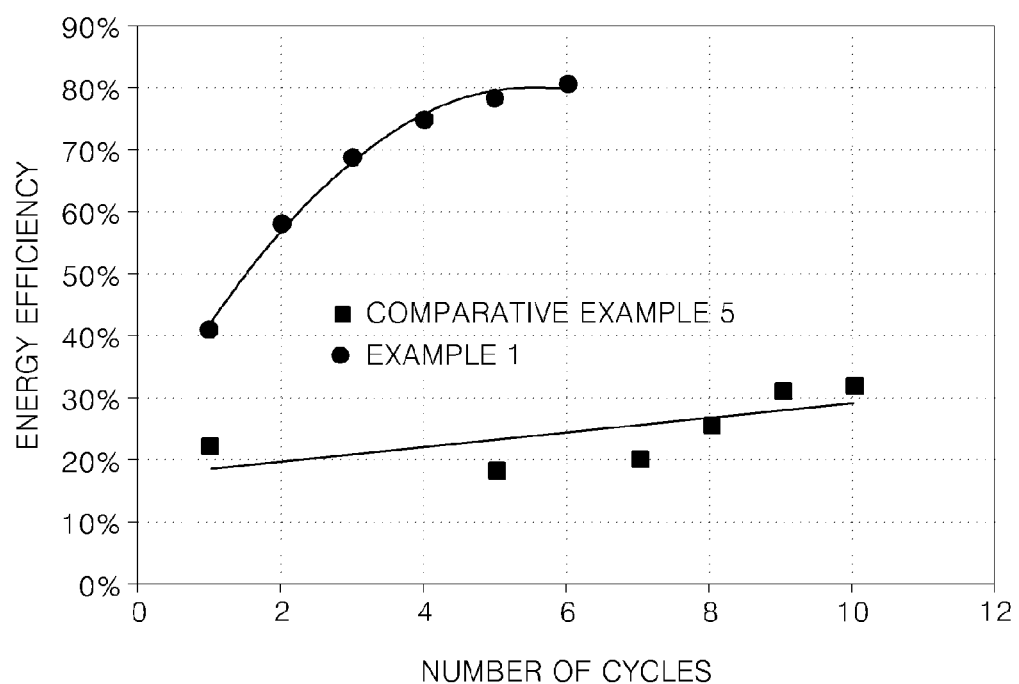
FIG. 5 is a graph showing energy efficiencies of the batteries of Example 1 and Comparative Example 5.
Figure 6:
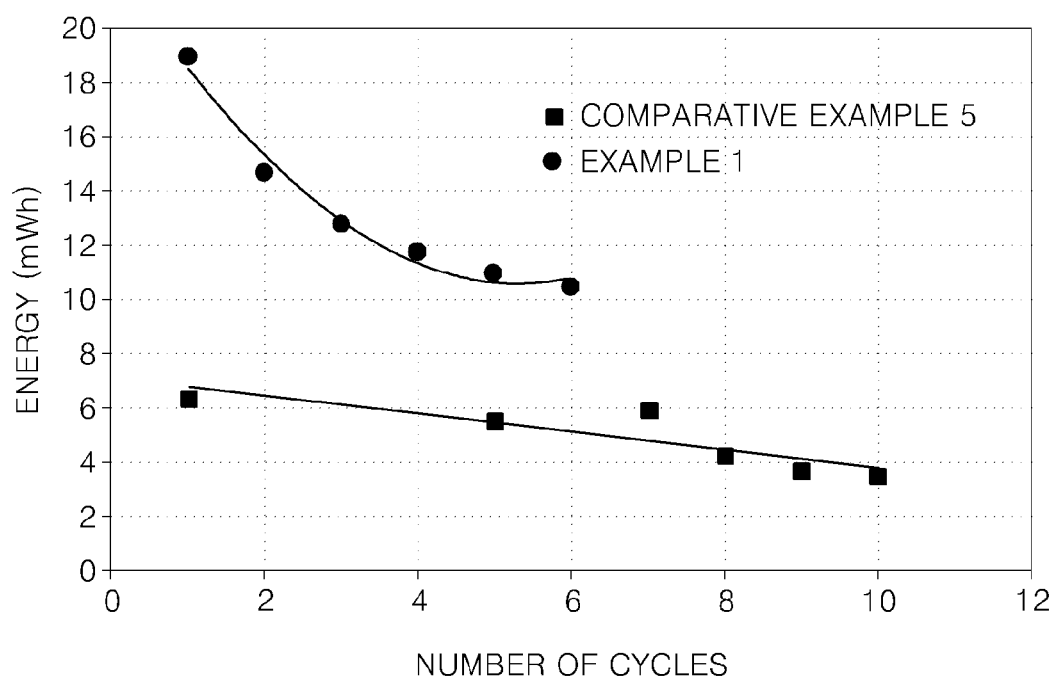
FIG. 6 is a graph showing energy amounts of the batteries of Example 1 and Comparative Example 5.

FIGS. 4 through 6 are graphs respectively showing charge and discharge efficiency, energy efficiency, and an energy amount of each battery. Here, the charge and discharge efficiency is shown as a percentage obtained by dividing amount of discharge by amount of charge, the energy efficiency is shown as a value obtained by multiplying voltage efficiency and charge and discharge efficiency, and the voltage efficiency is shown as a percentage obtained by dividing an average discharge voltage by an average charge voltage.

Figure 3:
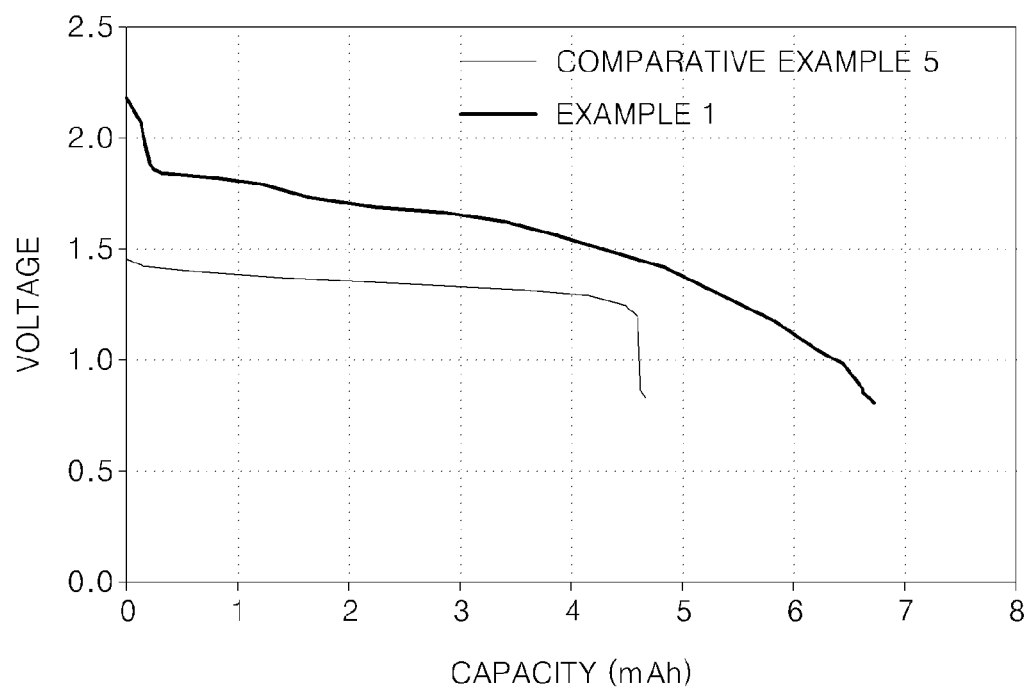
FIG. 3 is a graph showing discharge curves of batteries according to Example 1 and Comparative Example 5.

The results of the charge and discharge test are shown in FIG. 3. FIG. 3 is a graph showing discharge curves of the batteries according to Example 1 and Comparative Example 5. A current size of the battery of Example 1 was adjusted to be ½ of a current size of the battery of Comparative Example 5 due to high cell internal resistance while performing the charge and discharge test. Upon measuring a cell resistance by using an alternating current impedance method, a solution resistance of the battery of Example 1 was about 50 times larger than that of the battery of Comparative Example 5, with 5Ω. As shown in FIG. 3, the battery of Example 1 had a high open-circuit voltage of 2.3 V compared to 1.5 V of the vanadium redox flow battery of Comparative Example 5, and had a high average discharge voltage of 1.63 V. Moreover, the amount of discharge was 1.5 times higher than the vanadium redox flow battery of Comparative Example 5, despite the fact that the battery of Example 1 used about 60% of active material concentration of the vanadium redox flow battery of Comparative Example 5.

FIGS. 4 through 6 are graphs showing the charge and discharge efficiency, the energy efficiency, and the energy amount of the batteries prepared according to Example 1 and Comparative Example 5. Like FIG. 3, the current size of the battery of Example 1 was adjusted to be ½ of the current size of the battery of Comparative Example 5 due to high cell internal resistance while performing charging and discharging (charging with 10 mA and discharging with 5 mA). Comparing the peaks of the plots of FIGS. 4 through 6, the charge and discharge efficiency of the battery of Example 1 was about 89%, which is about 2.7 times higher than that of the battery of Comparative Example 5 (refer to FIG. 4), the energy efficiency of the battery of Example 1 was about 80.8%, which is about 2.5 times higher than that of the battery of Comparative Example 5 (refer to FIG. 5), and the energy amount of the battery of Example 1 was at least about 3 times higher than that of the battery of Comparative Example 5 at the first cycle (refer to FIG. 6).

As described above, according to the one or more of the above embodiments of the present invention, an organic electrolyte solution for a redox flow battery having high energy density, and a redox flow battery including the organic electrolyte solution are obtained.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An organic electrolyte solution comprising:
   a solvent; and
   an electrolyte comprising a metal-ligand coordination compound that has at least two electrons being transferred during oxidation-reduction, and is dissolved in an electrolyte solution while the metal-ligand coordination compound is in an atom state with zero oxidation.

2. The organic electrolyte solution of claim 1, wherein a metal in the metal-ligand coordination compound is at least one type selected from the group consisting of nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb) and vanadium (V).

3. The organic electrolyte solution of claim 2, wherein the metal is nickel (Ni).

4. The organic electrolyte solution of claim 1, wherein a ligand in the metal-ligand coordination compound is at least one selected from the group consisting of dipyridyl, terpyridyl, ethylene diamine, propylene diamine, phenanthroline, and N-heterocyclic carbon (NHC).

5. The organic electrolyte solution of claim 4, wherein the NHC is selected from the group consisting of 2,6-bis(methylimidazole-2-ylidene)pyridine, 1,3-dimesitylimidazole, 1,3-bis(2,5-diisopropylphenyl)imidazole, 1,3-dimethylimidazole, 1,3-di-tert-buthylimidazole, 1,3-dicyclhexylimidazole, and 1-ethyl-3-methylimidazole.

6. The organic electrolyte solution of claim 1, wherein the metal-ligand coordination compound performs a reversible oxidation-reduction reaction.

7. The organic electrolyte solution of claim 1, wherein the metal-ligand coordination compound is at least one compound selected from the group consisting of:

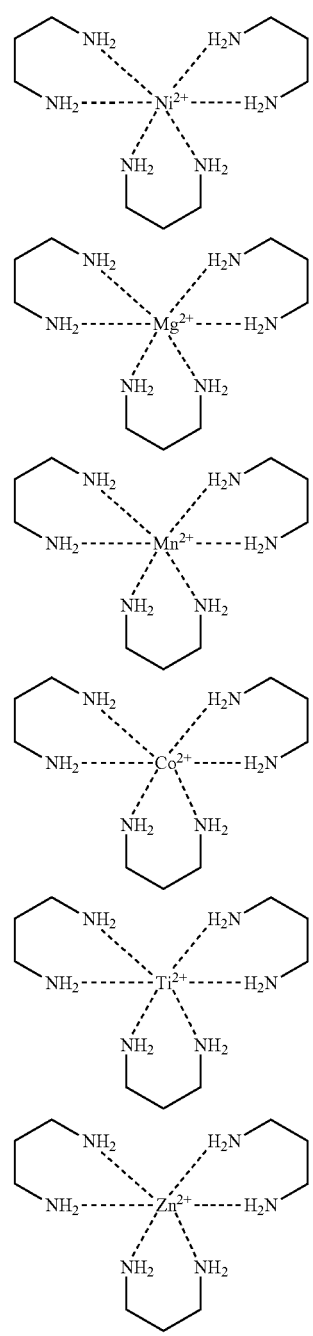

-continued
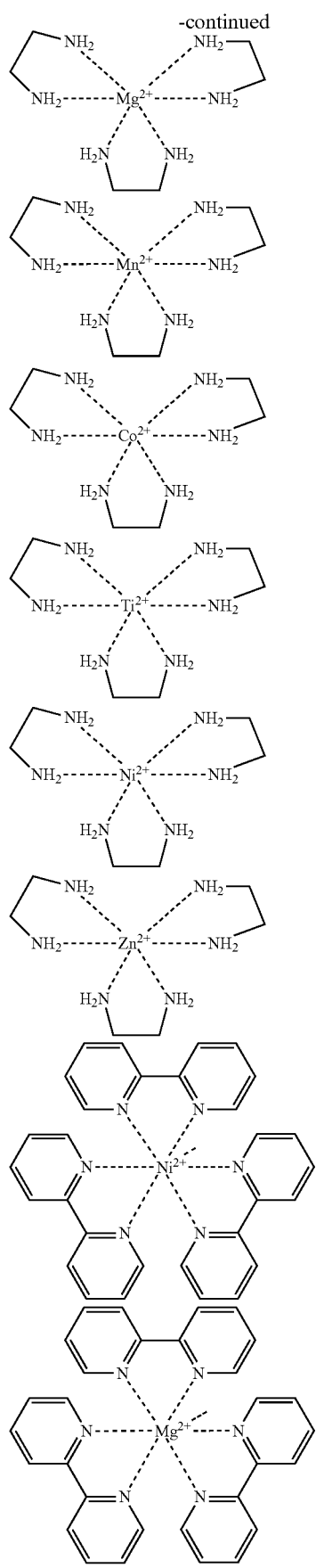
-continued
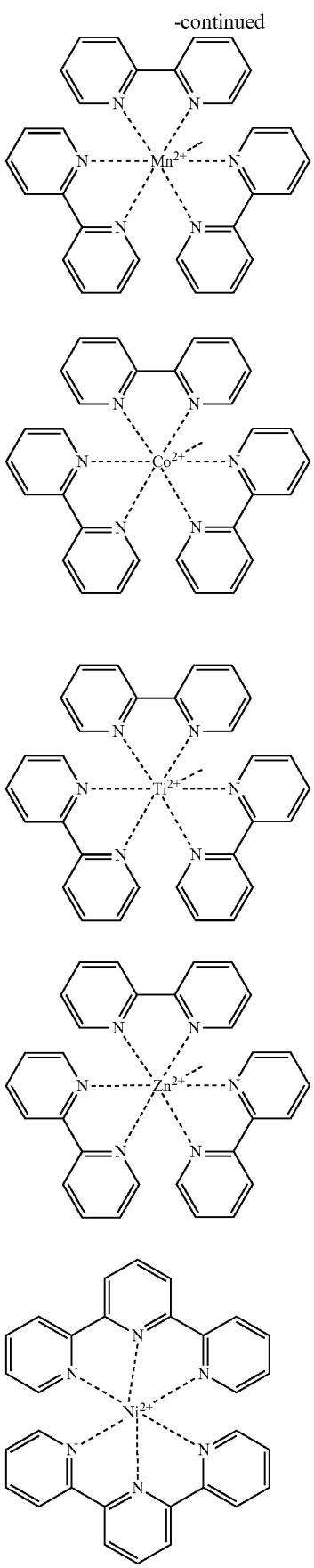

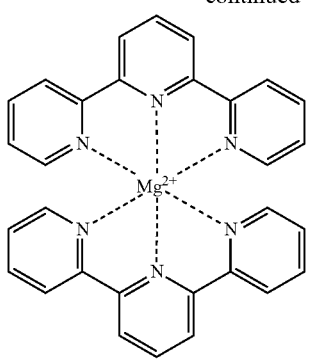
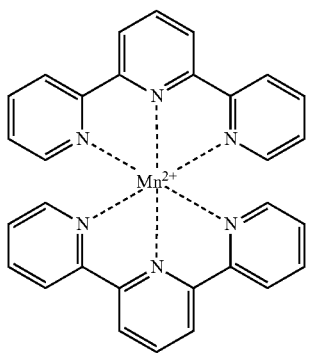
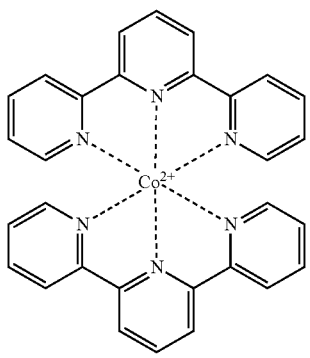
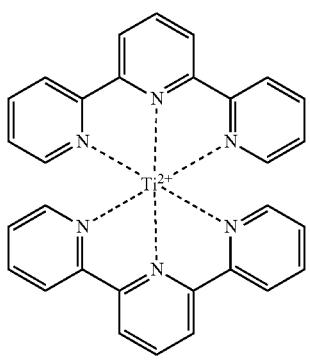
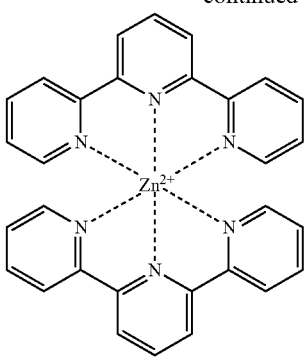
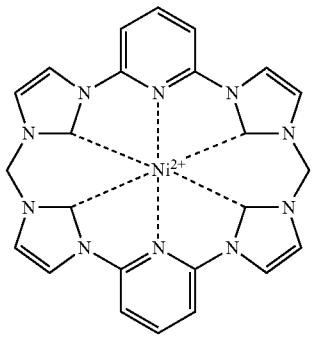
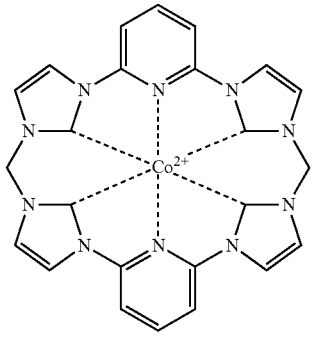
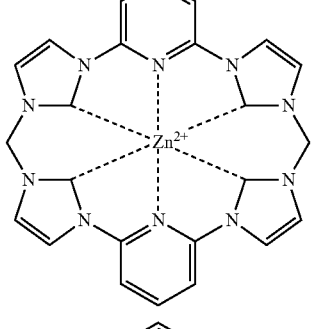
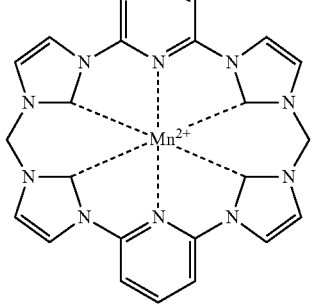

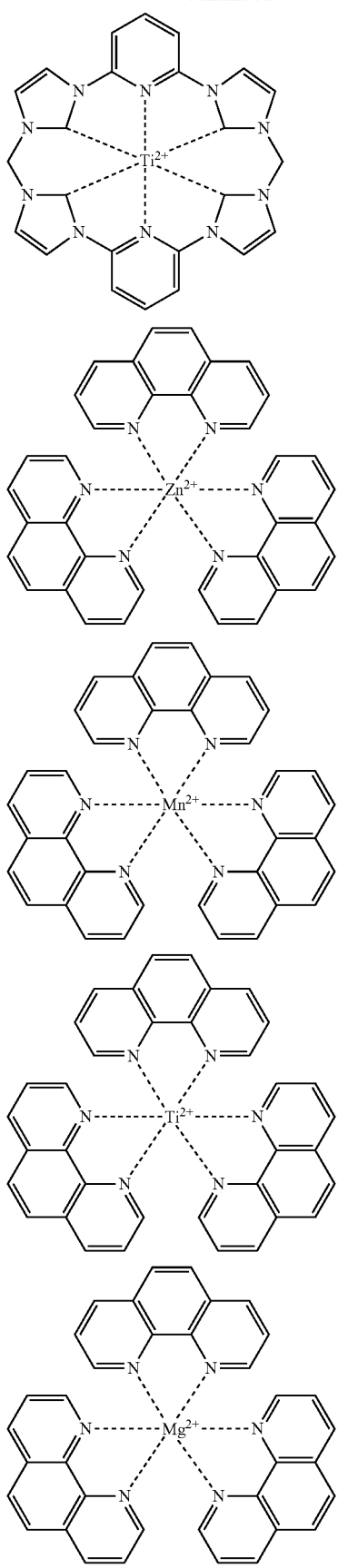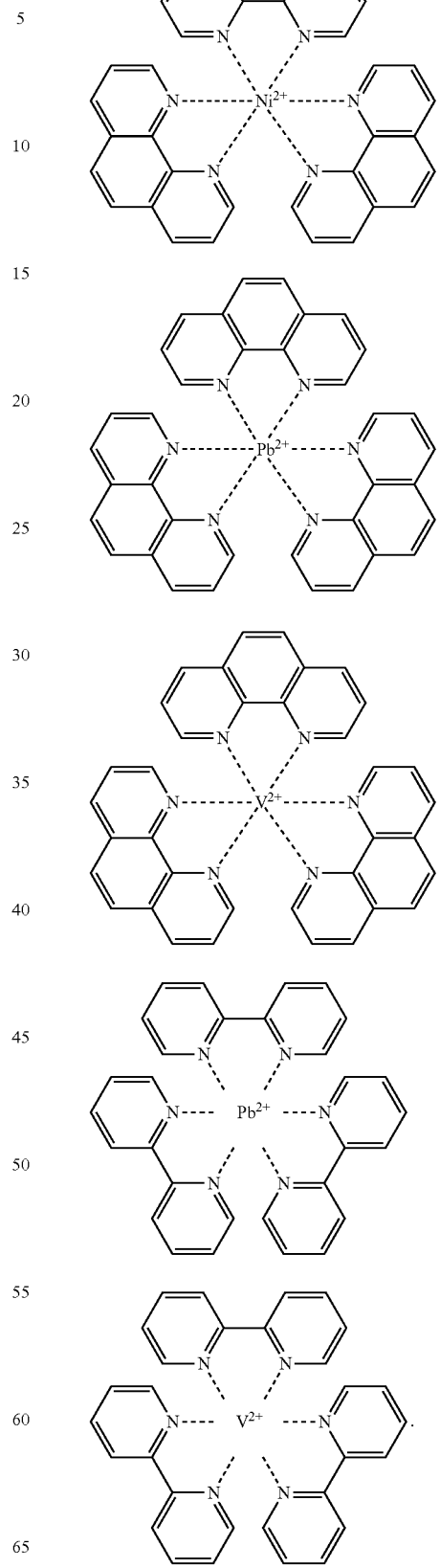

8. The organic electrolyte solution of claim 1, wherein the metal-ligand coordination compound further comprises $BF_4^-$, $PF_6^-$, $CF_3SO_3^-$, or $(CF_3SO_2)_2N^-$ as a counter anion.

9. The organic electrolyte solution of claim 1, wherein the solvent is an aqueous solvent, a non-aqueous solvent, an ionic liquid or a mixture thereof.

10. The organic electrolyte solution of claim 9, wherein the non-aqueous solvent is at least one type selected from the group consisting of dimethyl acetamide, diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, and N,N-dimethylacetamide.

11. A redox flow battery comprising:
a cathode cell comprising a cathode and a catholyte;
an anode cell comprising an anode and an anolyte; and
an ion exchange membrane disposed between the cathode cell and the anode cell,
wherein at least one of the catholyte and the anolyte comprises the organic electrolyte solution according to claim 1.

12. The redox flow battery of claim 11, wherein the catholyte and the anolyte comprise a redox couple of $Fe^{2+}/Ni^0$ or $Ru^{2+}/Ni^0$.

13. The redox flow battery of claim 11, further comprising:
a catholyte tank and an anolyte tank respectively connected to the cathode cell and the anode cell to transfer a fluid.

14. The redox flow battery of claim 11, wherein a metal in the metal-ligand coordination compound is at least one type selected from the group consisting of nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb) and vanadium (V).

15. The redox flow battery of claim 14, wherein the catholyte and the anolyte comprise a redox couple of $Fe^{2+}/Ni^0$ or $Ru^{2+}/Ni^0$.

16. The redox flow battery of claim 14, further comprising:
a catholyte tank and an anolyte tank respectively connected to the cathode cell and the anode cell to transfer a fluid.

17. The redox flow battery of claim 11, wherein a ligand in the metal-ligand coordination compound is at least one selected from the group consisting of dipyridyl, terpyridyl, ethylene diamine, propylene diamine, phenanthroline, and N-heterocyclic carbon (NHC).

18. The redox flow battery of claim 17, wherein the NHC is selected from the group consisting of 2,6-bis(methylimidazole-2-ylidene)pyridine, 1,3-dimesitylimidazole, 1,3-bis(2,5-diisopropylphenyl)imidazole, 1,3-dimethylimidazole, 1,3-di-tert-buthylimidazole, 1,3-dicyclhexylimidzole, and 1-ethyl-3-methylimidazole.

19. The redox flow battery of claim 17, wherein the catholyte and the anolyte comprise a redox couple of $Fe^{2+}/Ni^0$ or $Ru^{2+}/Ni^0$.

20. The redox flow battery of claim 17, further comprising:
a catholyte tank and an anolyte tank respectively connected to the cathode cell and the anode cell to transfer a fluid.

21. The redox flow battery of claim 11, wherein the metal-ligand coordination compound is at least one compound selected from the group consisting of:

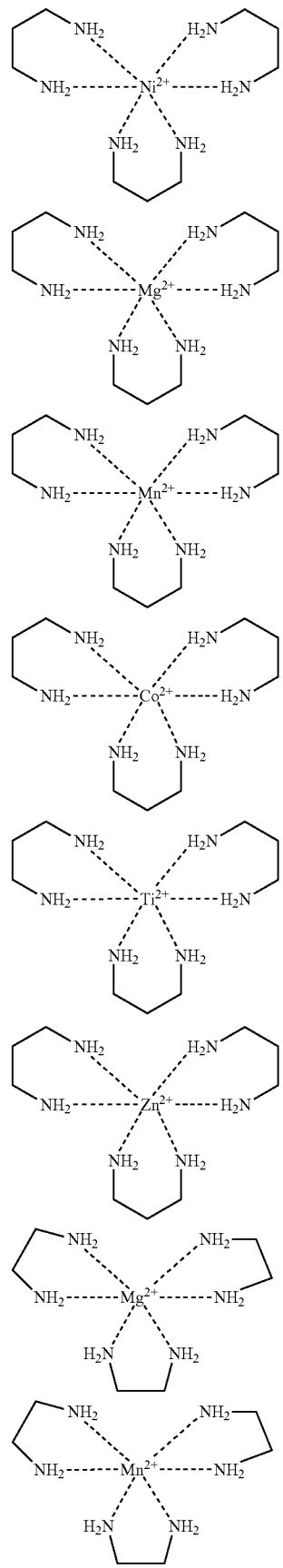

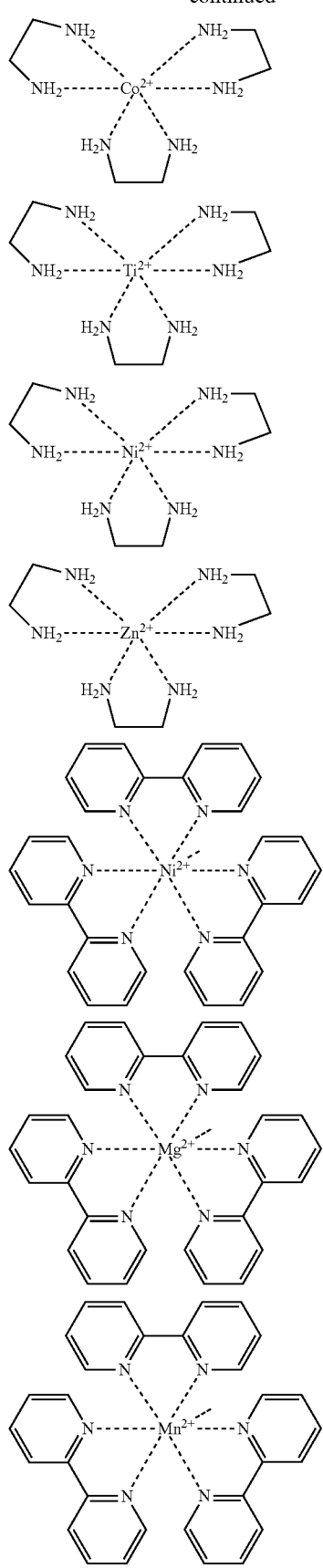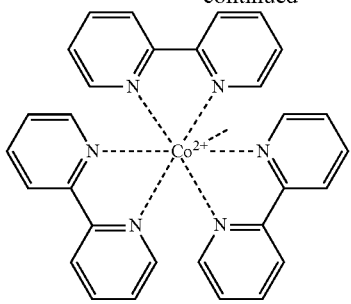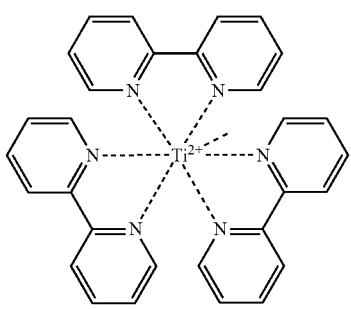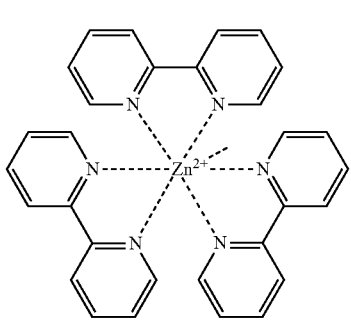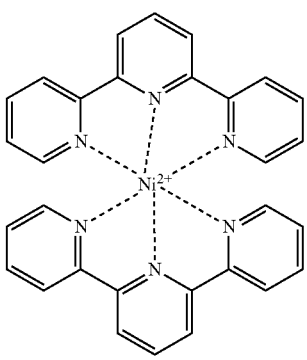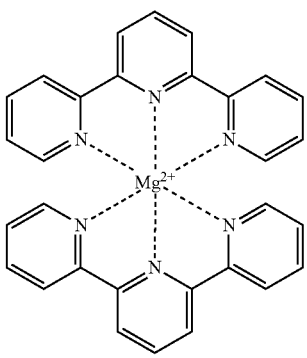

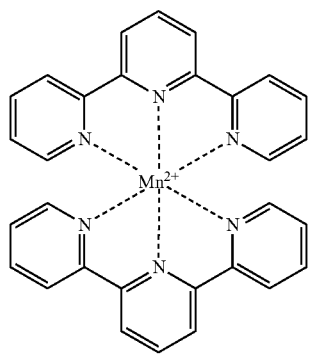
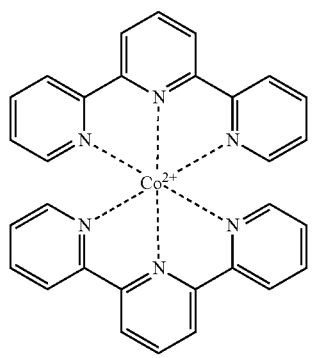
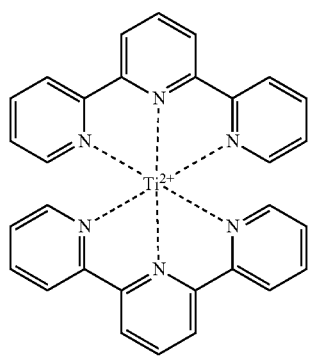
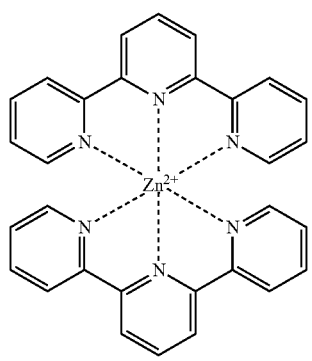
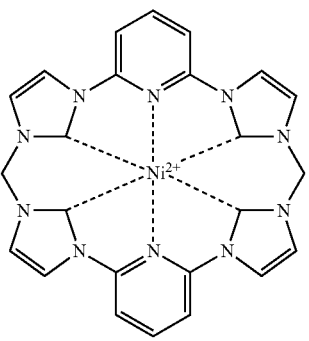
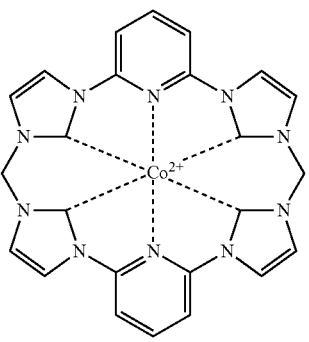
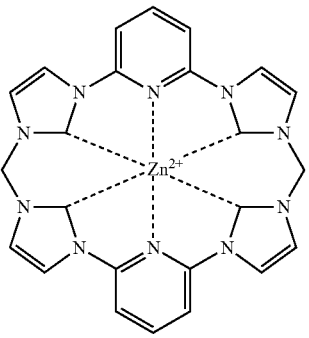
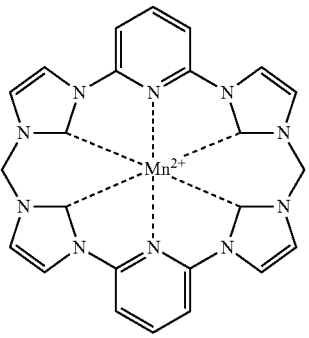
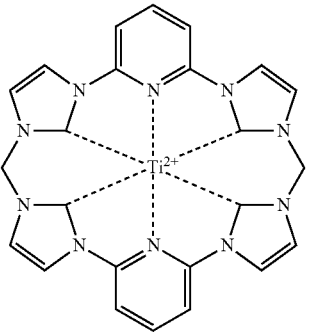

31
-continued

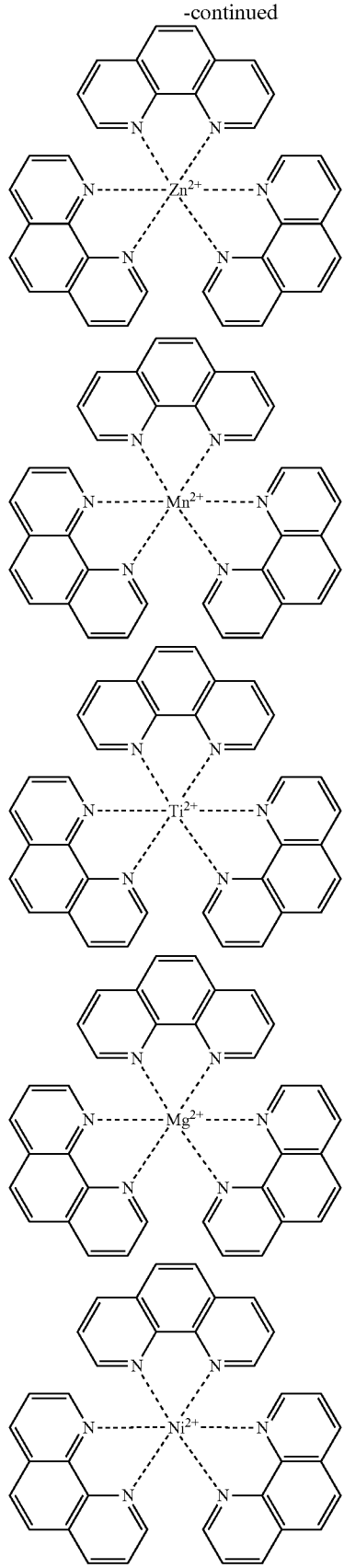

32
-continued

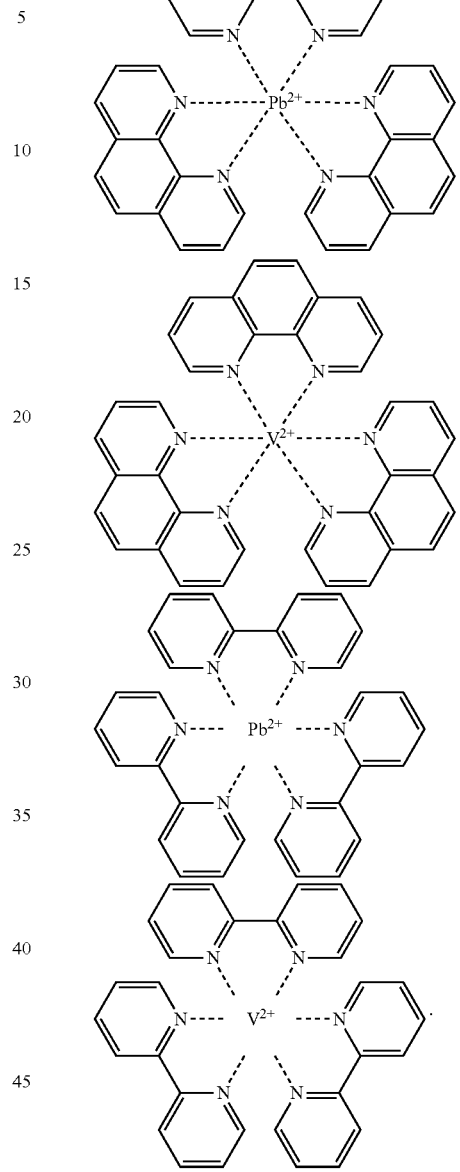

22. The redox flow battery of claim 21, wherein the catholyte and the anolyte comprise a redox couple of $Fe^{2+}/Ni^0$ or $Ru^{2+}/Ni^0$.

23. The redox flow battery of claim 21, further comprising: a catholyte tank and an anolyte tank respectively connected to the cathode cell and the anode cell to transfer a fluid.

24. The redox flow battery of claim 11, wherein the metal-ligand coordination compound further comprises $BF_4^-$, $PF_6^-$, $CF_3SO_3^-$, or $(CF_3SO_2)_2N^-$ as a counter anion.

25. The redox flow battery of claim 24, wherein the catholyte and the anolyte comprise a redox couple of $Fe^{2+}/Ni^0$ or $Ru^{2+}/Ni^0$.

26. The redox flow battery of claim 24, further comprising: a catholyte tank and an anolyte tank respectively connected to the cathode cell and the anode cell to transfer a fluid.

* * * * *